United States Patent
Heyworth

(10) Patent No.: US 6,367,195 B1
(45) Date of Patent: Apr. 9, 2002

(54) CHRISTMAS TREE WATERING DEVICE

(76) Inventor: Malcolm I. Heyworth, 7235 High Point Ct., Charlotte, NC (US) 28278

( * ) Notice: Subject to any disclaimer, the term of this patent is extended or adjusted under 35 U.S.C. 154(b) by 325 days.

(21) Appl. No.: 08/534,705

(22) Filed: Sep. 27, 1995

(51) Int. Cl.[7] .............................................. A47G 33/12
(52) U.S. Cl. ..................................................... 47/40.5
(58) Field of Search ......................................... 47/40.5

(56) References Cited

U.S. PATENT DOCUMENTS

| | | | |
|---|---|---|---|
| 3,469,342 A | * 9/1969 | Morris | ........................ 47/40.5 |
| 4,653,224 A | 3/1987 | Weckesser | |
| 4,825,587 A | * 5/1989 | Stancil | ......................... 47/40.5 |
| 4,993,176 A | 2/1991 | Spinosa | |
| 5,009,028 A | 4/1991 | Lorenzana et al. | |
| 5,016,389 A | 5/1991 | Odom, Jr. | |
| 5,157,868 A | 10/1992 | Munoz | |
| 5,201,140 A | * 4/1993 | Voorhis | ....................... 47/40.5 |
| 5,279,071 A | 1/1994 | McDougall | |
| 5,363,591 A | * 11/1994 | Jones | ........................... 47/40.5 |
| 5,369,910 A | * 12/1994 | Copenhaver | ................. 47/40.5 |

* cited by examiner

Primary Examiner—Peter M. Poon

(57) ABSTRACT

There is provided a tree irrigation device which includes a tree stand having a device for maintaining water around the butt end of a tree, a water reservoir located apart from the tree, and a conduit having a first end connected to the base of the water reservoir and a second end connected to the base of the device for maintaining water. When the device is assembled and water is placed in the reservoir, the level of water in the reservoir and the tree stand receptacle are the same.

3 Claims, 2 Drawing Sheets

CHRISTMAS TREE WATERING DEVICE

BACKGROUND OF THE INVENTION

1. Field of the Invention

The present invention relates to a tree watering device. More particularly, the present invention relates to a device for continuously providing water to the butt of a freshly cut tree, such as a Christmas tree.

2. Description of the Prior Art

The desirability of providing water to the butt end of a freshly cut Christmas tree to keep it from drying out is well known. Many tree stands provide a water receptacle or container in which the butt of the tree rests when the tree is placed in the stand. However, freshly cut Christmas trees can consume from about one to two quarts of water per day, and thus, the water must be replenished on a regular basis. One of the problems with using these tree stands is that it is often difficult to observe the water level in the tree stand receptacle and it is even more difficult to refill the receptacle as the tree consumes the water.

Efforts have been made to overcome this problem such as the assembly set forth in U.S. Pat. No. 4,653,224 to Weckesser. The Weckesser patent is directed to a Christmas tree irrigation system that supplies water from a separate reservoir through a flexible water feeding tube to a water container that forms a part of a tree stand. A water feeding tube is attached to an outlet located at the top of the reservoir and extending to the bottom. This arrangement requires the user to siphon water from the reservoir to the container in the stand. In each embodiment of the Weckesser device the delivery tube is at some point above the upper level of the water in both the stand container and the reservoir.

Another example of a tree watering system is disclosed in U.S. Pat. No. 4,993,176 to Spinosa, which discloses a tree watering system that includes a reservoir from which a water hose and an air hose extend. The hoses have terminal ends which are positioned in a water container that forms a portion of the tree stand. The terminal ends are cut on the bias and positioned so that when the air hose becomes exposed to the atmosphere water is caused to flow from the reservoir to the container through the water hose. The difficulty with this system is that should the reservoir or the tree get bumped and the air hose becomes accidentally exposed, an excessive release of water may occur spilling onto the floor.

In U.S. Pat. No. 5,157,868 to Munoz there is disclosed yet another example of a Christmas tree watering device. Munoz also discloses a watering system that requires a water reservoir and a tube for carrying water to the receptacle of a tree stand. The reservoir must be raised high enough to provide a siphon for the water to flow to the receptacle. In addition, Munoz requires that the water hose be attached to the tree stand presumably so that it will not accidently fall out of the receptacle causing water to pour onto the floor.

SUMMARY OF THE INVENTION

It is therefore an object of the present invention to provide an improved yet simple tree watering device.

Another object of the present invention is to provide a tree watering device which has a water reservoir remote from the tree stand.

Yet another object of the present invention is to provide a tree watering device that does not require the water to be siphoned for the device to operate.

It has been found that these objects are accomplished by the present invention in which there is provided a Christmas tree watering device which is simple and easy to use. In one embodiment the watering device includes a tree stand having a receptacle as part of the stand for retaining water around the butt end of a tree, a water reservoir located apart from the tree, and a conduit having a first end connected at the base of the water reservoir and a second end connected at the base of the tree stand watering receptacle, whereby water in the reservoir and water in the receptacle remain at the same height. In another embodiment the watering device comprises a tree stand in which a water retaining receptacle is placed below and surrounding the tree butt support. The tree watering device can be adapted to many different types of tree stands.

BRIEF DESCRIPTION OF THE DRAWINGS

Other objects, features and advantages of the present invention will become apparent from the following detailed description taken in conjunction with the accompanying drawings in which.

DETAILED DESCRIPTION OF THE PREFERRED EMBODIMENTS

Figure 1:
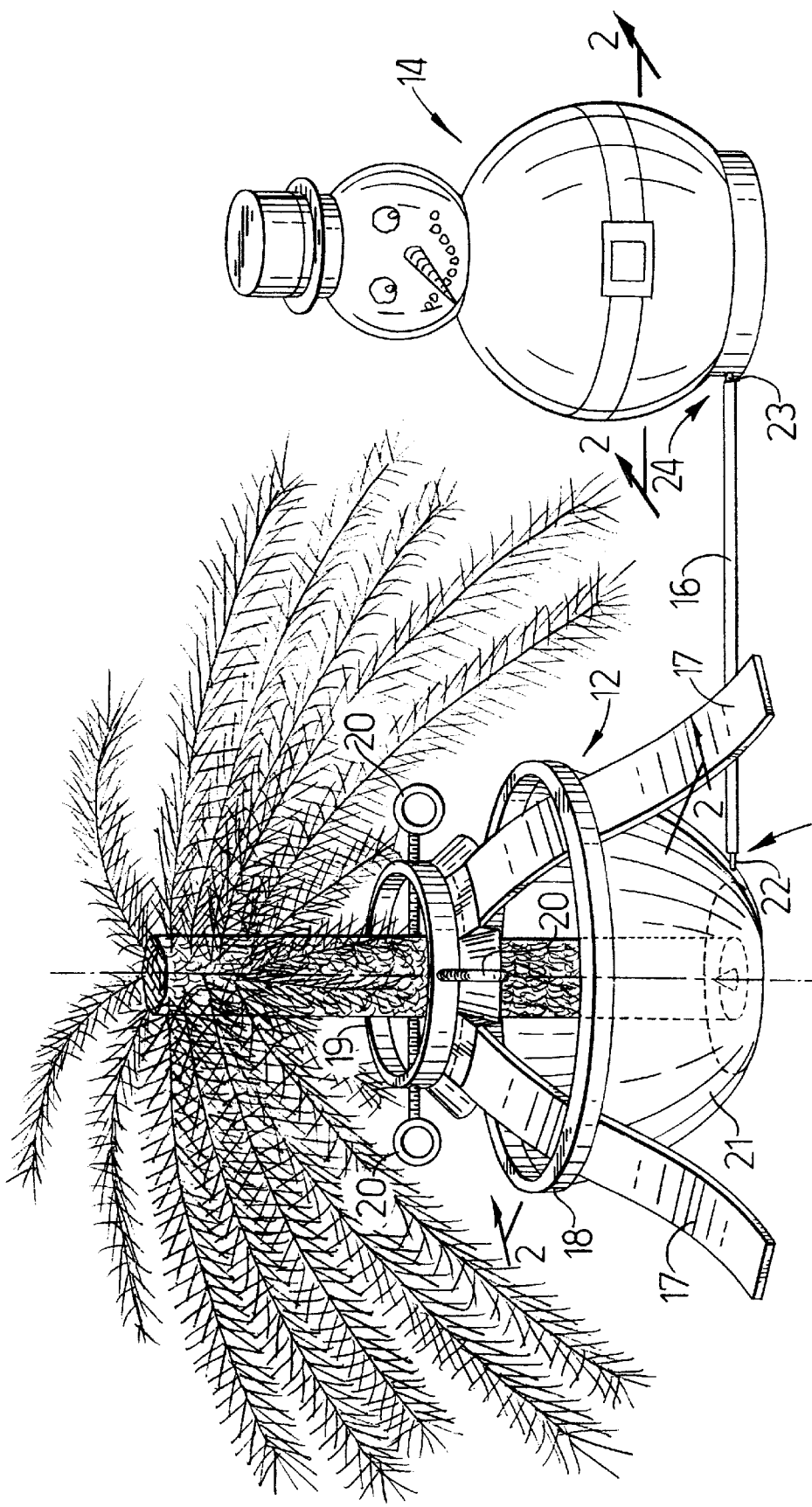
FIG. 1 is a perspective view of a preferred embodiment of the present invention.

Referring now to FIG. 1, there is shown a perspective view of the tree watering device 10 of the present invention comprising a tree stand 12, a water reservoir 14 and a conduit 16 assembled to continuously supply water over a period of time to the butt of a tree, such as a Christmas tree, supported in the stand.

Figure 2:
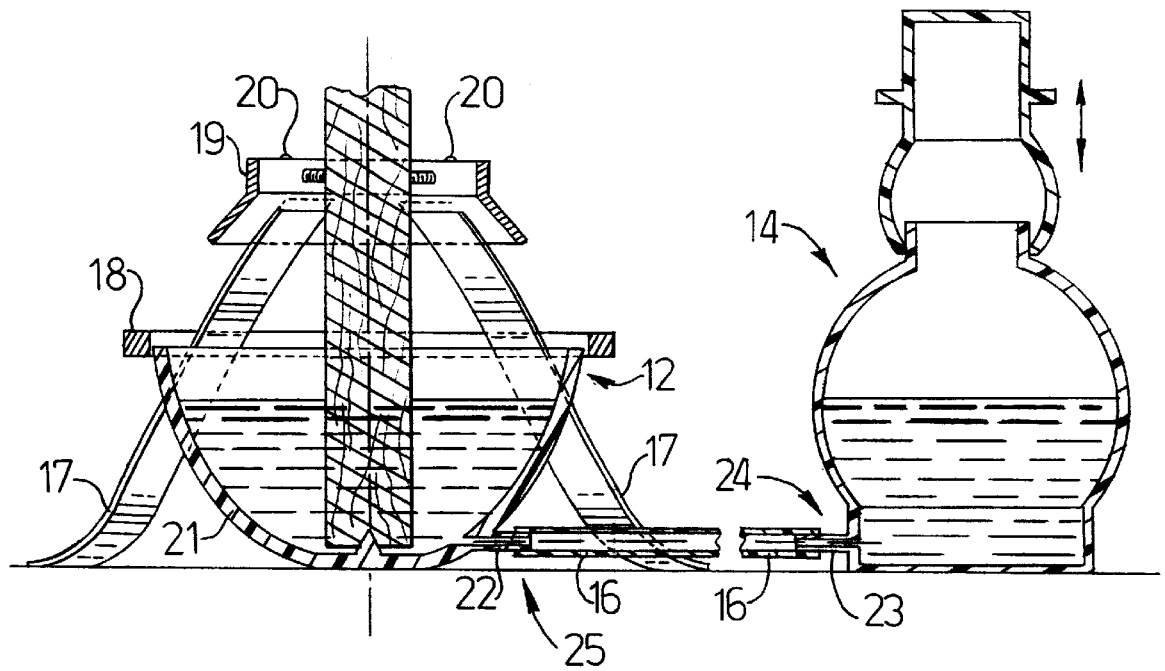
FIG. 2 is a vertical section taken through the tree stand, conduit and water reservoir.

There is shown in the embodiment of FIG. 2 a tree stand 12 formed of a metal steel, for example, and having three legs 17 (one leg is not shown) which engage a ring 18 and are in spaced relation to each other. The free end of the legs support a second ring 19 which has a series of adjustable screws 20 at a position equally spaced around the second ring 19. The screws may be threaded into the second ring 19 to hold the trunk of a tree which is positioned coaxially with the second ring. A receptacle 21, capable of retaining water around the butt of the tree, is a part of the tree stand and mounted below the rings with its bottom either resting on the floor or close thereto in which the terminal end of the tree trunk rests. The water receptacle is formed of a base and sides and has a connection 22 located in the side at or near the base adapted to receive one end of the conduit 16. The receptacle 21 may be either part of the stand itself or, as shown in FIG. 3, may be a separate receptacle which fits below and surrounds the tree butt.

The water reservoir 14 is in the form of a hollow piece preferably formed of a rigid plastic material. The reservoir is formed of a base (or bottom) and sides. The reservoir is preferably about the same height as the tree stand and includes an aperture 23 located in the side at or near the base adapted to receive the other end of the conduit 16. The reservoir may have a decorative form, such as the form of a Santa Claus, snowman or other seasonal figure.

The conduit 16 has a first end 24 connected to aperture 23 of the water reservoir 14 and a second end 25 attached to connector 22 of the tree stand receptacle 21. The conduit may be made of a flexible rubber or plastic tubing.

Figure 3:
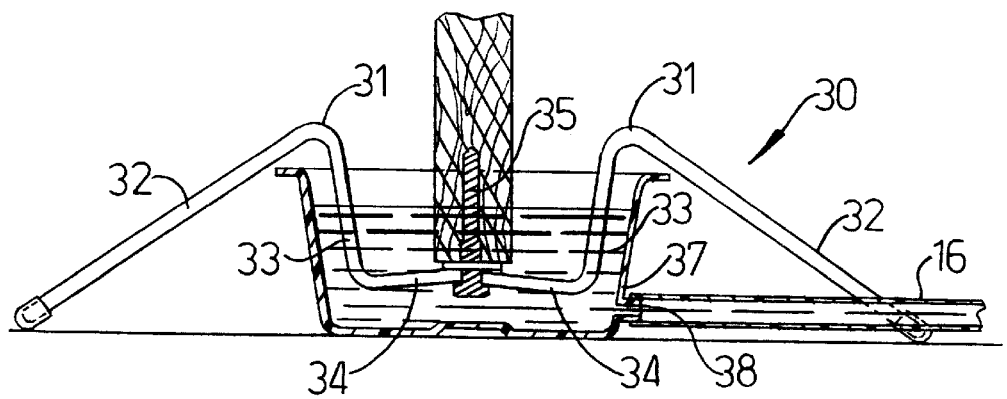
FIG. 3 is a sectional view of an alternative embodiment of a tree stand of the present invention.

Turning now to the embodiment of the tree stand shown in FIG. 3, there is provided a tree stand 30 that includes a plurality of legs 31 formed of rigid material that are of the same shape and size and that are interconnected at their inner ends 34 to form a substantially rigid structure. The outer end portions 32 are of equal length and are adapted to allow the tree to stand upright on-a supporting surface such as a table or floor. The stand 30 has intermediate portions 33 that are positioned above the outer end portions 32 to form a support platform under which a water receptacle, pan 37, can be placed. The inner end portions 34 of the legs are positioned at an elevation above the outer ends 32 but below the intermediate portions so that the inner ends 34 are disposed within the pan 37. The water receptacle 37 has a connection 38 located in. the side at or near the base adapted to receive one end of the conduit 16. The inner end portions of the stand are adapted to receive the butt end portion of a tree and have an elongated retaining means 35 that is attached to and extends vertically from the intersection of the inner end portions of the legs. Such a stand is disclosed in U.S. Pat. No. 5,350,149 to Evans, et al.

Assembly of the device is accomplished by simply connecting the ends of the conduit after the tree has been erected. The reservoir is filled with water and in doing so the water passes through the conduit to the tree receptacle. The water in the receptacle remains at the same height as the water in the reservoir. Thus, the user simply looks into the reservoir to determine the water level and adds more water as needed.

If water in the reservoir tree stand becomes stagnated or develops an odor, the water reservoir may be emptied by pouring the stagnate water in the reservoir into a bucket, settling the reservoir back onto the floor allowing additional amounts of, stagnate water in the stand to drain back into the reservoir until all stagnant water is removed. Then fresh water may be added to the reservoir. This procedure is used when disassembling the tree to prevent water spill on carpet or floor.

While the present invention has been described in connection with the exemplary embodiments thereof, it will be understood that any modifications will be apparent to those of ordinary skill in the art and that this application is intended to cover any adaptations or variations thereof. Therefore, it is manifestly intended that this invention be only limited by the claims and equivalents thereof.

What is claimed is:

1. A Christmas tree watering device comprising:

a stand for holding the butt of a Christmas tree above the surface on which said stand rests;

a receptacle for retaining water having a base and sides and adapted to be positioned beneath the butt end of said tree, said receptacle being separate and apart from said tree stand;

a water reservoir having a base and sides, said reservoir being located apart from said tree stand; and a single conduit having a first end connected to said base of said water reservoir and a second end connected to said base of said receptacle for retaining water, whereby when water is placed in said water reservoir, the water passes to said receptacle and automatically remains at the same height as the water in said water reservoir.

2. The Christmas tree watering device according to claim 1 wherein said first end of said conduit and said second end of said conduit are at substantially the same height from the surface on which said stand rests.

3. The Christmas tree watering device according to claim 1 wherein said water reservoir has a decorative form.

\* \* \* \* \*